Dec. 3, 1940. K. BOEDEKER ET AL 2,223,348
APPARATUS FOR INTRODUCING GASES INTO LIQUIDS
Filed June 25, 1937
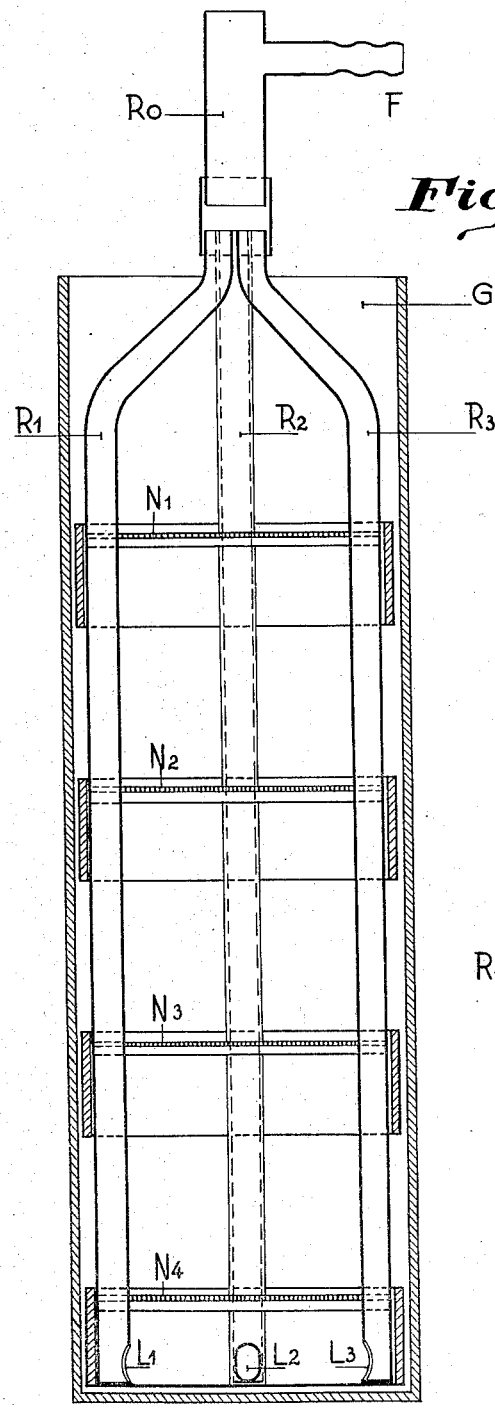
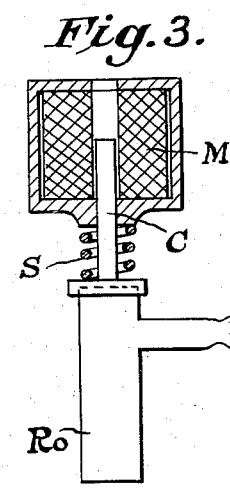
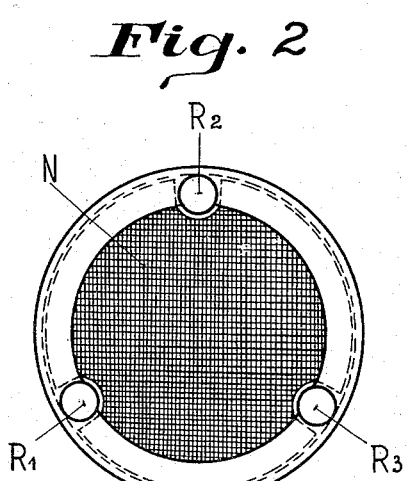
Karl Boedeker
Oskar Köhler
INVENTORS
BY *Stutz and Joslin*
THEIR ATTORNEYS Patented Dec. 3, 1940

2,223,348

UNITED STATES PATENT OFFICE 2,223,348

APPARATUS FOR INTRODUCING GASES INTO LIQUIDS

Karl Boedeker, Frankfort-on-the-Main-Hochst, and Oskar Köhler, Frankfort-on-the-Main-Unterliederbach, Germany, assignors, by mesne assignments, to Walther H. Duisberg, New York, N. Y.

Application June 25, 1937, Serial No. 150,268 In Germany July 3, 1936

5 Claims. (Cl. 261—81)

The present invention relates to a method and apparatus for introducing gases into liquids.

In order to carry out chemical reactions between a liquid and a gas, the gas is generally introduced into the liquid. For this purpose it is necessary to subdivide the gas as finely as possible in order to produce as large an active surface area as possible for the reaction. Fine subdivision of the gas has the further advantage that, as the speed with which very fine bubbles rise is smaller than that in the case of large bubbles, the time available for the reaction to proceed is increased. Previous attempts to produce this fine subdivision involved introducing the gas into the liquid via a fine-meshed sieve or a finely porous filter plate. The first of these methods has the drawback that, owing to the action of capillarity in producing a resistance to the passage of the gas, the latter must be under a certain raised pressure before entering the sieve. Eventually a large quantity of gas which has accumulated below the net suddenly passes through it, with the result that gas bubbles which may have been divided by the net at once combine again to form large bubbles. The second-mentioned method necessitates that the gas be under a raised pressure, the value of which depends on the dimensions of the pores of the filter in order that the gas pass through the latter and the raised pressure involves the use of additional apparatus. Furthermore, the quantity of gas which passes through the finely porous filter plate is very small.

Now we have found that a fine subdivision of the gas, i. e., very fine bubbles may be produced with the aid of a simple net or gauze if this gauze, while the gas is passing through, is caused rapidly to oscillate, for instance in a quick vertical motion. The frequency of these oscillations may be several hundreds of cycles per second, while the amplitude need not exceed some tenths of a millimeter. It is contemplated that amplitudes of from 0.1 millimeter to 0.3 millimeter will be more usually employed, although in certain cases the viscosity of the liquid concerned may require the amplitude to be different from these values— it may be, for example, 0.08 millimeter. The meshes are made as small as possible. Such nets or gauzes as, when not oscillated, present a considerable resistance to the passage through of the gas owing to capillarity, may be used in the method and apparatus according to the invention without difficulty. By the invention an entirely uniform passage of fine bubbles through the gauze is attained, whereas without the oscillating motion large quantities of gas would pass through in an entirely irregular and jerky manner and in a badly subdivided form, after a certain quantity of gas has accumulated below the net. A pressure raised higher than the hydrostatic pressure of the liquid to be overcome or than any other static pressure which may be involved is not necessary. The effect of capillarity in hindering the passage of the gas through the gauze is nullified by the oscillating motion of the net.

Several oscillating gauzes, spaced by predetermined distances, may be arranged one above the other. Gas bubbles which may accidentally reunite during their ascent from one gauze are again subdivided by the next gauze. Furthermore, the speed of ascent of the gas is retarded by the gauzes and the time available for the reaction is thereby increased.

A further advantage lies in the fact that owing to the oscillations which are constantly being formed in the liquid, the gas bubbles are retained for some time at the points of intersection of these oscillations while being given a vigorous and continuous movement. The liquid and the gas are thus very well mixed and the reaction is promoted.

In the accompanying drawing which diagrammatically illustrates a device in accordance with the invention—

Fig. 1 is a longitudinal cross-section through the device which includes gauzes or nets $N_1$, $N_2$, $N_3$ and $N_4$.

Fig. 2 is a plan view of a net or gauze.

Fig. 3 is a cross-section showing suitable means for imparting oscillating movements to the gauzes or nets N.

The gas is introduced through the tubes $R_1$, $R_2$ and $R_3$ which also serve as supports for the nets or gauzes $N_1$, $N_2$, $N_3$ and $N_4$. The gas enters into the reaction liquid through the openings $L_1$, $L_2$ and $L_3$. The gas is fed to the tubes $R_1$, $R_2$ and $R_3$ through the lateral filling pipe F and the tube $R_0$ which simultaneously serves as a support for the whole device, the tubes $R_1$, $R_2$ and $R_3$ being fastened to the tube $R_0$.

The nets are placed in the vessel G containing the reaction liquid, and are suspended by apparatus which causes them to oscillate up and down in the liquid. This apparatus which is arranged outside of the container may be of any known or suitable kind. A suitable form of apparatus is illustrated in Fig. 3 of the drawing wherein an electromagnetically actuated device is shown.

In this figure, M is a solenoid which is connected to electrical energizing means of a suitable kind, not shown. C is a core or plunger which is in turn affixed to the tube $R_0$ of Fig. 1. A spring S is provided for returning the plunger C to its initial position when the solenoid is deenergized. It is self-evident that when the solenoid is energized the plunger is drawn upwardly into the solenoid and when the solenoid is deenergized the spring returns the plunger to its initial position. The rate of oscillation of the plunger and of the attached pipe and net frame assembly, therefore, depends upon the rate at which the solenoid is energized and deenergized. It is to be understood that this means is intended to be illustrative only and that any other well known solenoid or mechanical means for imparting the desired oscillations to the frame and attached nets are within the contemplation of the present invention and may be used.

We claim:

1. A device for introducing gases in a finely subdivided form into liquids which comprises a container for the liquid, fine meshed nets arranged essentially horizontally in the liquid, means for introducing gas beneath the lowermost net, rigid frame means for supporting said nets and driving means connected to said rigid frame means for rapidly oscillating said frame means and nets whereby gas bubbles are dislodged from the surface of the nets before they have an opportunity to coalesce into large bubbles.

2. A device for introducing gases in a finely subdivided form into liquids which comprises a container for the liquid, fine meshed nets arranged essentially horizontally in the liquid, means for introducing gas beneath the lowermost net, rigid frame means for supporting said nets and driving means connected to said rigid frame means for rapidly oscillating said frame means and nets in a vertical direction whereby gas bubbles are dislodged from the surface of the nets before they have an opportunity to coalesce into large bubbles.

3. A device for introducing gases in a finely subdivided form into liquids which comprises a container for the liquid, fine meshed nets arranged essentially horizontally in the liquid, means for introducing gas beneath the lowermost net, rigid frame means for supporting said nets and driving means connected to said rigid frame means for rapidly oscillating said frame means and nets with a frequency of several hundreds of cycles per second and an amplitude of some fractions of a millimeter whereby gas bubbles are dislodged from the surface of the nets before they have an opportunity to coalesce into large bubbles.

4. A device for introducing gases in a finely subdivided form into liquids which comprises a container for the liquid, fine meshed nets arranged essentially horizontally in the liquid, means for introducing gas beneath the lowermost net, rigid frame means for supporting said nets and driving means connected to said rigid frame means for rapidly oscillating said frame means and nets in a vertical direction with a frequency of several hundreds of cycles per second and an amplitude of some fractions of a millimeter whereby gas bubbles are dislodged from the surface of the nets before they have an opportunity to coalesce into large bubbles.

5. A device for introducing gases in a finely subdivided form into liquids which comprises a container for the liquid, a plurality of fine meshed nets arranged essentially horizontally and one above the other in the liquid, means for introducing gas into the liquid beneath the lowermost net at a pressure substantially equal to the hydrostatic pressure to be overcome, rigid frame means for supporting said nets and maintaining the several nets in a predetermined spaced relationship and driving means connected to said rigid frame means for rapidly oscillating said frame means and nets at a frequency and amplitude sufficient to overcome the capillarity effect which would otherwise prevent the passage of the gas through the nets whereby the gas bubbles are dislodged from the surface of the nets before they have an opportunity to coalesce into large bubbles.

KARL BOEDEKER.
OSKAR KÖHLER.